Patented May 26, 1925.

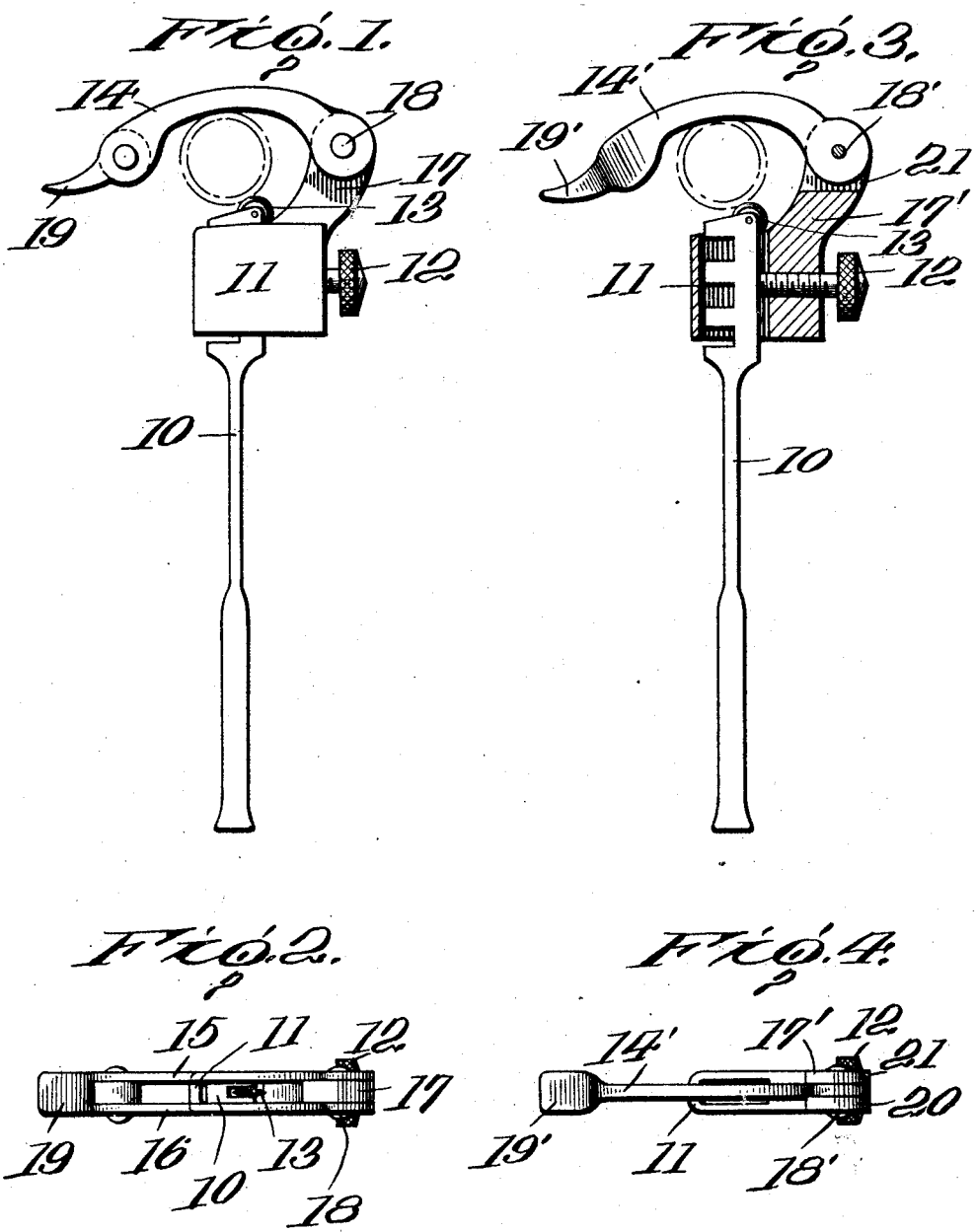

1,538,903

UNITED STATES PATENT OFFICE.

ADAM OGINT, OF BROOKLYN, NEW YORK.

GLASS-TUBE CUTTER.

Application filed October 27, 1923. Serial No. 671,152.

*To all whom it may concern:*

Be it known that I, ADAM OGINT, a citizen of the United States, residing at Brooklyn, in the county of Kings and State of New York, have invented certain new and useful Improvements in Glass-Tube Cutters, of which the following is a specification.

The invention relates to a device for cutting glass tubes, and has as an object the provision of a clamp for holding an ordinary steel roller glass cutter, so that the same may be caused to cut tubes.

Illustrative embodiments of the invention are shown in the accompanying drawings, in which—

Fig. 1 is a side elevation of a form of the invention showing a glass cutter in place with a tube shown in dotted lines.

Fig. 2 is an end view of the form of Fig. 1.

Fig. 3 is a side elevation, partly broken away, of a modified form of the device, and Fig. 4 is an end view of the form of Fig. 3.

As shown, the device is adapted to receive and immovably hold a glass cutter 10 of well known form. To receive the glass cutter, there is shown a clamp member 11 adapted to surround the head of the cutter, and a set screw 12 which, when tightened may impinge against the cutter, as more clearly shown in Fig. 3.

To hold the tube in working relation to the roller 13 of the cutter, there is shown a lever 14 which, in the form of the device shown in Figs. 1 and 2, comprises two members 15, 16, spanning a projection 17 from the clamp member 11 and movable thereabout upon a pivot 18.

To provide the necessary pressure of the tube against the roller, there is shown a finger piece 19, comprising a flattened projection from the juncture of the members 15, 16. When the device has been closed upon a tube in the manner shown in the drawings, the hand of the user may grasp the clamp member 11, and a finger or a thumb of the same hand may press upon the portion 19 when the device may be revolved upon the tube to cause the roller to encircle and to produce a furrow in the glass in the well known manner, after which the tube may be broken off.

In the form of the device shown in Fig. 3, the projection 17′ is bifurcated to provide the two portions 20, 21, as shown in Fig. 4, and the lever 14′ consisting of a single member is passed between the portions 20, 21, and secured thereto upon the pivot 18′. The member 14′ terminates in a finger piece 19′, and the action of the device is like that of the form of Figs. 1 and 2.

Minor changes may be made in the physical embodiment of the invention without departing from its spirit.

I claim:

1. A cutter for glass tubes comprising, in combination, means for holding the head of a cutter member, means pivoted on said cutter member holding means and partially encircling the glass tube and to be pressed by the hand against the tube in the cutting operation.

2. A cutter for glass tubes comprising, in combination, a clamp adapted to removably receive and hold the head of a glass cutter, a projection from said clamp, an element pivotally mounted upon said projection adapted to partially surround a tube and to be pressed by the hand thereagainst to hold the tube in operative relation to the cutting element carried by said head.

3. A cutter for glass tubes comprising, in combination, a clamp having an opening adapted to surround the head of a glass cutter, a set screw to be tightened upon said head to render the glass cutter immovable with its cutting element exposed, a projection from said clamp, a hand operated lever pivoted to said projection adapted to partially surround a tube and hold the same in operative relation to the cutting element carried by said cutter.

ADAM OGINT.